United States Patent

[11] 3,548,854

| [72] | Inventors | Raymond W. Warren<br>7925 Falstaff Road, McLean, 22101;<br>Elmer L. Swartz, 7406 Englewood Place,<br>Annandale, Va. 22003 |
|---|---|---|
| [21] | Appl. No. | 764,251 |
| [22] | Filed | Oct. 1, 1968 |
| [45] | Patented | Dec. 22, 1970 |

[54] FLUIDIC ANGLE OF ATTACK SENSOR FOR SUPERSONIC AIRCRAFT
9 Claims, 4 Drawing Figs.

| [52] | U.S. Cl. | 137/81.5 |
|---|---|---|
| [51] | Int. Cl. | F15c 1/04, F15c 4/00 |
| [50] | Field of Search | 73/180, 147; 137/81.5 |

[56] References Cited
UNITED STATES PATENTS

| 2,523,481 | 9/1950 | Rabenhorst | 73/147 |
| 2,551,526 | 5/1951 | Campbell | 73/147 |
| 3,244,001 | 4/1966 | Pettingall | 73/180 |
| 3,327,529 | 6/1967 | Bowles et al. | 73/180 |
| 3,447,554 | 6/1969 | Josephson | 137/81.5 |
| 3,452,707 | 7/1969 | Warren | 137/81.5 |
| 3,460,554 | 8/1969 | Johnson | 137/81.5X |

*Primary Examiner*—Samuel Scott
*Attorneys*—Harry M. Saragovitz, Edward J. Kelly, Herbert Berl and J. D. Edgerton ABSTRACT: A system for determining the angle of attack of an aircraft has a series of sensor holes located in the forward portion of the underside of the aircraft wing to sense airflow past the wing. Each sensor hole communicates with a biased bistable fluid amplifier which directs the power fluid of the amplifier to a first output channel when there is no signal from the sensor hole and to a second output channel when a signal is present from the sensor hole due to a pressure gradient on the underside of the wing. The bias of the bistable amplifier is established by communicating part of the power fluid of the amplifier into a control channel. Each bistable amplifier is connected to an indicator which identifies the flow through the output channels and the readings of the indicators will give a digital readout of the angle of the attack.

PATENTED DEC 22 1970  3,548,854

INVENTORS
RAYMOND W. WARREN
ELMER L. SWARTZ

BY Harry M. Saragovitz, Edward J. Kelly
Herbert Berl and J. D. Edgerton
ATTORNEYS

3,548,854

FLUIDIC ANGLE OF ATTACK SENSOR FOR SUPERSONIC AIRCRAFT

BACKGROUND OF THE INVENTION

Before the climb and glide ability of an aircraft can be accurately determined it is necessary that temperature, altitude and gross weight of the aircraft be accounted for. For precision flying, calculations can be made prior to take off which, with the aid of an air speed indicator, allow for manual computation of the angle of attack. Accurate measurement of the angle of attack enables a pilot to calculate the maximum rate of climb, attainable, the most efficient rate of climb the maximum glide range, and the longitudinal stability of the aircraft. Where conditions of environment and the aircraft itself change rapidly, such as gross weight due to fuel consumption, density of the air, and external temperature, the accurate determination of the instantaneous angle of attack permits much more economical and precise flying.

While the angle of attack can be manually attained by means of calculations and data prior to and during flight there is no system presently available which can simply and effectively automatically determine the angle of attack of an aircraft instantaneously under its varying flight conditions.

It is therefore the object of this invention to provide an angle of attack sensor for an aircraft which will indicate the angle formed by the cord line of the wing and the relative wind.

Another object of the invention is to provide an angle of attack sensor to aid in determining the climb and glide characteristics of an aircraft.

Still an additional object of the invention is to provide an angle of attack sensor for aircraft using fluidic components.

A further object of the invention is to provide a fluidic angle of attack sensor which will be simple to design and inexpensive to manufacture and install.

SUMMARY OF THE INVENTION

A plurality of sensor holes are located in the forward portion of the underside of a wing, each hole communicating via a fluidic conduit to a first control channel of a bistable fluid amplifier. The outputs of each bistable amplifier are connected to an indicating means which will register a switch of the power stream from one output channel to another when a signal is received from the sensor hole due to a pressure gradient at the respective sensor hole location on the underside portion of the wing. By positioning the sensor holes in a transverse direction along the wing it becomes possible to obtain a digital readout of the angle of attack.

BRIEF DESCRIPTION OF THE DRAWINGS

The specific nature of the invention as well as other objects, aspects, uses, and advantages thereof will clearly appear from the following description and from the accompanying drawing, in which.

DESCRIPTION OF THE PREFERRED EMBODIMENTS

Figure 1A:
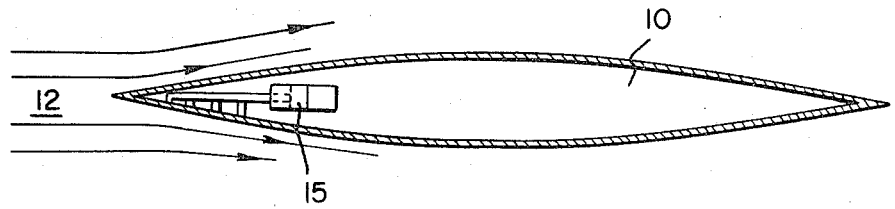
FIGS. 1a and 1b are schematic representations of an aircraft wing in an airstream for zero and positive angles of attack.
Figure 1B:
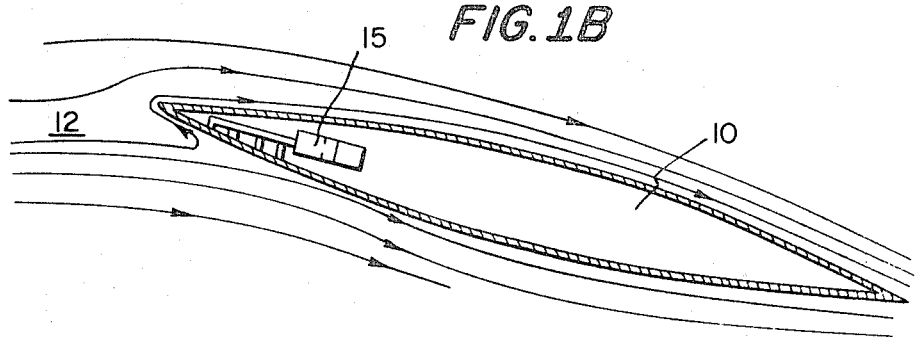

As illustrated in FIGS. 1a and 1b, an aircraft wing used in supersonic flight normally has a low thickness ratio and sharp leading and trailing edges. FIG. 1a illustrates wing 10 with a bank of angle of attack sensors 15 therein during flight through airstream 12 having a zero angle of attack. During flight the airstream 12 will incur only a small stagnation region in front of the leading edge of wing 10. In the zero angle of attack position, the incoming flow will divide almost symmetrically at the leading edge of the wing 10 and pass over and under the wing in a relatively smooth manner. As the angle of attack increases, as shown in FIG. 1b, the pressure gradient under the wing will increase. Due to this increased pressure gradient, some of the flow previously passing underneath the wing 10 will reverse its direction and pass above the wing. Because of this reversal of airstream direction the effective region where the flow of airstream 12 divides will move to a position underneath wing 10. The position of the dividing point of airstream 12 will be a direct function of the angle of attack of the aircraft.

Figure 2:
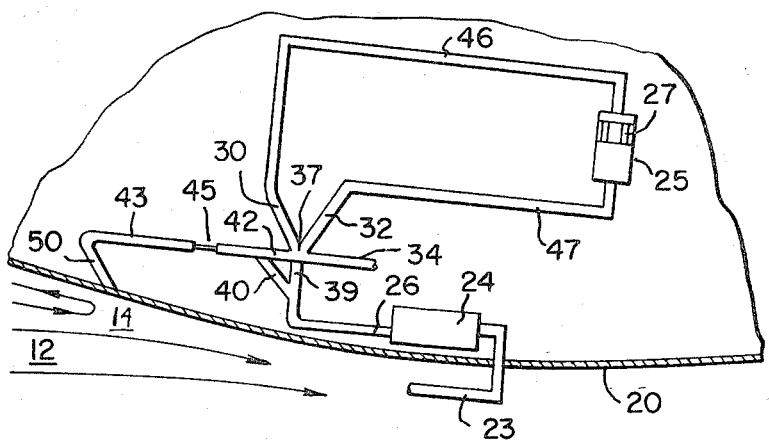
FIG. 2 is a cutaway view of an angle of attack sensor mounted on the underside of a wing in accordance with my invention.

The reversal of air flow at a point underneath the wing can be detected with a sensor shown in FIG. 2. The airstream 12 flows along the underside 20 of wing 10 and divides its air flow at region 14, some of the air continuing along the bottom of the wing and the remainder of the air flow reversing its direction to flow past the topside of the wing. The location of region 14 is detected by a sensor hole 50 located in the underside of wing 20 and connected through a conduit 43 to a bistable fluid amplifier 37. The bistable amplifier 37 has first and second output channels 30 and 32, a left control channel 42 connected to conduit 43 through a fluidic resistance 45, a right foam channel 34 opened to atmosphere and a power stream input channel 39. Ram air passing under the wing enters a power source intake channel 23 and is filtered by a filter 24 before passing via channel 26 into channel 39 of the bistable amplifier 37. A biasing channel 40 is also provided to bleed some of the power jet into the left control channel 42. The left and right output channels 30 and 32 are connected by conduits 46 and 47 to opposite ends of an output channel flow indicator 25 which can be a cylinder with a plastic foam disc 27 enclosed therein.

During operation the fluid amplifier 37 is supplied with filtered ram air flowing from intake channel 23 and filter 24 through conduit 26 to the power source channel 39. Part of the input power jet will pass through biasing channel 40 to the left control channel 42. When the air flow under the wing is from front to rear, as when the wing has a zero angle of attack, fluid is aspirated from the sensor hole 50 thereby increasing the flow from the left control channel 42 and bias channel 40 towards the resistor 45 and conduit 43 leading to the sensor hole 50. The right control channel 34 which is open to atmosphere will cause the amplifier 37 to switch to the left output channel 30. The fluid flowing through the output channel 30 and conduit 46 to the indicator 25 will push the pa plastic disc 27 indicator to the bottom of the indicating tube.

As the angle of attack of the wing 10 increases, the changing pressure gradient will shift the region 14 from the front of the wing 10 towards the rear. When region 14 is located near sensor hole 50 the increased pressure gradient will impede the flow from sensor hole 50 instead of aspirating the flow as when flow is from front to rear. The result is increased flow from the bias channel 40 into the left control channel 42 causing the output of the fluid amplifier to switch to the right output channel 32. The reversal of flow in the output channel will cause the plastic disc 27 in the indicator 25 to rise to a higher position thus indicating to the pilot of the aircraft that the pressure gradient has moved further back on the wing and is now located in close proximity to the sensor hole associated with the indicator.

Figure 3:
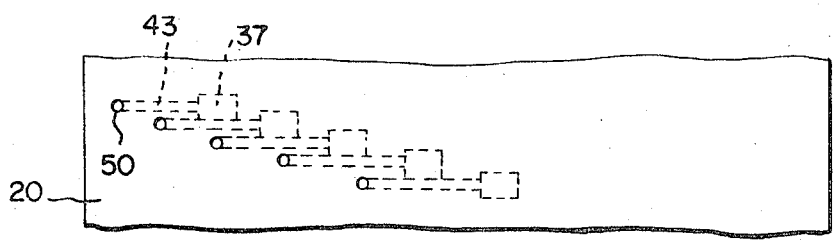
FIG. 3 is a partial view of the underside of a wing having mounted therein a plurality of a fluidic sensor holes comprising a system to measure the angle of attack of a wing.

FIG. 3 shows a portion of the underside of the aircraft wing 20 with a series of sensors mounted therein. Each sensor has a hole 50 and an amplifier 37 connected by a conduit 43. For purposes of simplicity the input channels and indicators are not shown shown for each sensor; however, they would be similar to the ones shown in FIG. 2. Each sensor is progressively offset from the preceding sensor so that when the pressure gradient or point of reversal of air flow moves from the front of the wing to the rear, the reversal will be detected by a succeeding or preceding sensor arrangement. With a separate indicator for each sensor arrangement on the pilot's instrument panel, the pilot of an aircraft is provided with a digital readout of the angle of attack by glancing at the number of raised discs within the indicators 25.

Because the transmission of a signal from the sensor holes to the amplifiers will be at the speed of sound, the response time of the indicators up to a distance of 100feet of tubing will be much faster than the response time of the pilot. For this reason the indicators can be said to register instantaneously with a change of angle of attack. Alternatively, the indication signal from the amplifiers can be adapted as an input to a fluidic auto-pilot to control the aircraft. Further signal amplification can be introduced with additional amplifier stages and the time response factor will be little affected since each stage of amplification will add less than a millisecond of response time. Flow gains up to $10^5$ may be obtained with a plurality of stages and ample power output will be readily available to accomplish almost any control function that may be desired.

It will be apparent that the embodiments shown are only exemplary and that various modifications can be made in construction and arrangement within the scope of the invention as defined in the appended claims.

We claim:

1. A system for detecting the reversal of air flow underneath the wing of a supersonic aircraft comprising:
    a. a fluid amplifier having a power nozzle, first and second output channels and first and second control channels;
    b. ram air intake means for providing power fluid to said fluid amplifier;
    c. bias means for normally causing said power fluid to exhaust through said first output channel; and
    d. sensing means located at the underside forward portion of said wing and in fluid communication with said first control channel for causing said power fluid to exhaust through said second output channel whenever reversal of air flow takes place underneath said wing.

2. The system as defined in claim 1 wherein said second control channel communicates with atmosphere.

3. The system as defined in claim 1 further comprising a fluid resistance located in said first control channel.

4. The system as defined in claim 1 further comprising an air filter located in said ram air intake means.

5. The system as defined in claim 1 further comprising:
    a. a plurality of sensing means each offset from the preceding sensing means by a small distance;
    b. a plurality of fluid amplifiers each coupled to each of said sensing means; and
    c. means for indicating the position at which reversal of air flow takes place.

6. The system as defined in claim 5 wherein each of said amplifiers is provided with power fluid from the same ram intake means.

7. The system as defined in claim 5 wherein each of said amplifiers is provided with separate ram air intake means.

8. The system as defined in claim 5 wherein each of said fluid amplifiers is provided with a fluid resistance in its first control channel.

9. The system as defined in claim 5 wherein said second control channel of each of said 1 fluid amplifiers communicates with atmosphere.

PO-1050
(5/69)

UNITED STATES PATENT OFFICE
CERTIFICATE OF CORRECTION

Patent No. 3,548,854            Dated December 22, 1970

Inventor(s) Raymond W. Warren and Elmer L. Swartz

It is certified that error appears in the above-identified patent and that said Letters Patent are hereby corrected as shown below:

On the cover page, after "Patented Dec. 22, 1970" insert the following:

[73] Assignee    The United States of America as represented by the Secretary of the Army Signed and sealed this 6th day of April 1971.

(SEAL)
Attest:

EDWARD M. FLETCHER, JR.        WILLIAM E. SCHUYLER, JR
Attesting Officer                Commissioner of Patents